May 1, 1956  R. O. WHITAKER  2,743,797
ELECTRICALLY OPERATED REMOTE CONTROL SYSTEM
Filed June 3, 1955  4 Sheets-Sheet 1
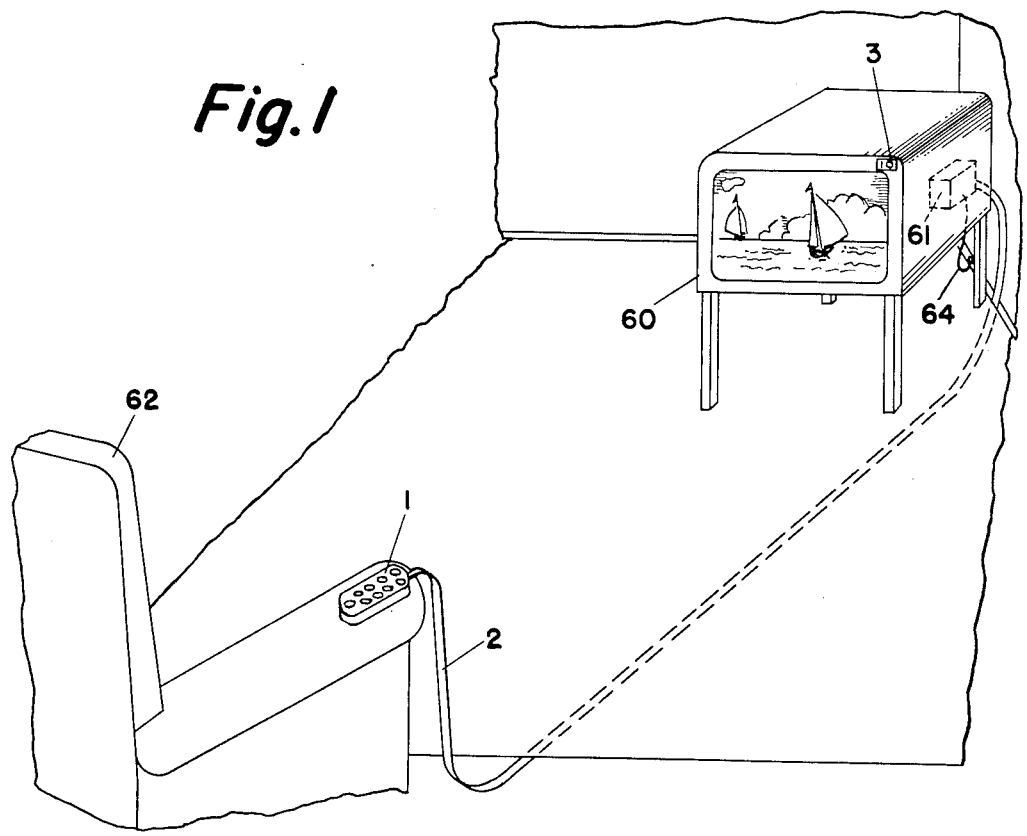
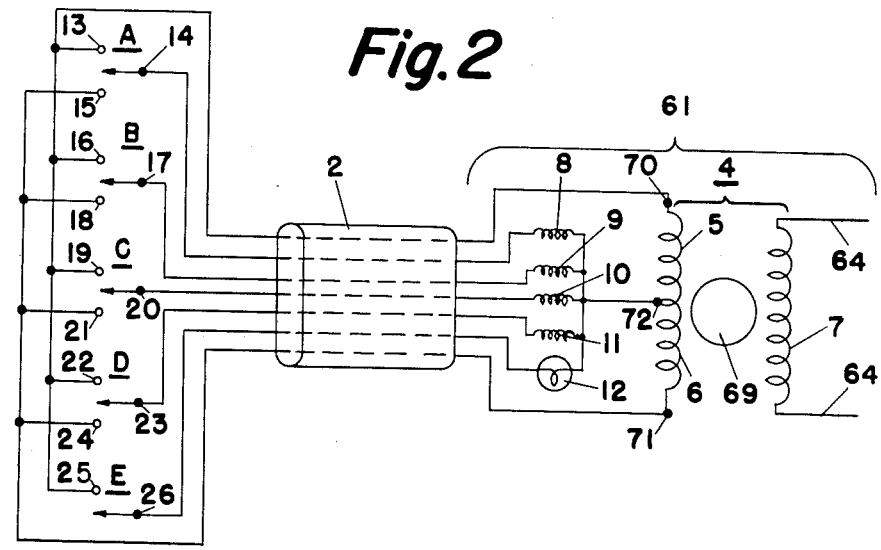

May 1, 1956    R. O. WHITAKER    2,743,797
ELECTRICALLY OPERATED REMOTE CONTROL SYSTEM
Filed June 3, 1955    4 Sheets-Sheet 2

May 1, 1956 R. O. WHITAKER 2,743,797
ELECTRICALLY OPERATED REMOTE CONTROL SYSTEM
Filed June 3, 1955 4 Sheets-Sheet 3

United States Patent Office 2,743,797
Patented May 1, 1956

2,743,797

ELECTRICALLY OPERATED REMOTE CONTROL SYSTEM

Ranald O. Whitaker, Perkasie, Pa.

Application June 3, 1955, Serial No. 513,103

12 Claims. (Cl. 192—.02)

This invention relates to remote control systems and particularly to those in which an electric motor is selectively coupled to one of various devices to be actuated; for example, a remote control system in which an electric motor is selectively coupled to the contrast, volume, fine tuning and channel-selector controls of a television receiver.

In accordance with the invention, the power for operating an electromagnetic clutch means for selectively coupling the motor to the various devices to be actuated is derived from a motor winding which is inductively coupled to a second motor winding which is normally energized from an A. C. (alternating current) power line. There is thus avoided the need for auxiliary components for excitation of the selector circuits: by proper choice of coil parameters, it is also possible to have only low voltages and low currents in the selector circuits. By having the windings conductively isolated from each other, there is avoided the danger of having control circuits at power-line voltage.

More particularly, and in the preferred system, the closing of a selector switch corresponding with the device to be actuated completes the circuit of a shading winding of the motor through the electromagnet of the corresponding clutch, said closing of the selector switch concurrently initiates operation of the motor and effects engagement of the clutch members coupling the motor to the selected device.

More specifically, the motor is of the reversible type having shading windings whose circuits may be selectively closed by each of the selector switches to determine the direction of operation of the motor and to provide the energizing current for the electromagnet of that clutch which corresponds with the device to be actuated by the motor.

Further, in accordance with the invention, one or more of the controlled devices may be provided with position-indicators including an electrically-operable element energizable by current derived from a shading winding of the motor. More specifically, the position-indicator may be a belt or dial having numerals illuminated by an electric bulb energizable from current induced in the shading winding.

The invention further resides in features of construction, combination and arrangement hereinafter described and claimed.

For a more detailed understanding of the invention and for illustration of various embodiments thereof, reference is made to the accompanying drawings in which:

Fig. 1, in perspective, illustrates the remote control system as used with a television receiver;

Fig. 2 is a schematic wiring diagram of components of the control system of Fig. 1;

Fig. 2A schematically illustrates a motor utilizable in the system of Fig. 2;

Figs. 2B and 2C schematically illustrate selector switches utilizable in the switch box of Figs. 1 and 2;

Figure 2A:
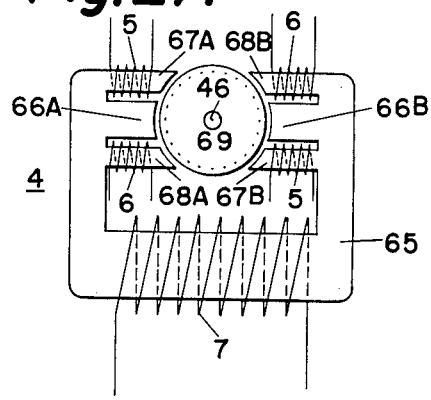
Figure 5:
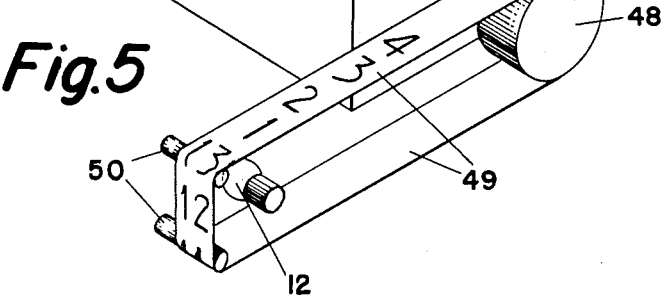
Figure 6:
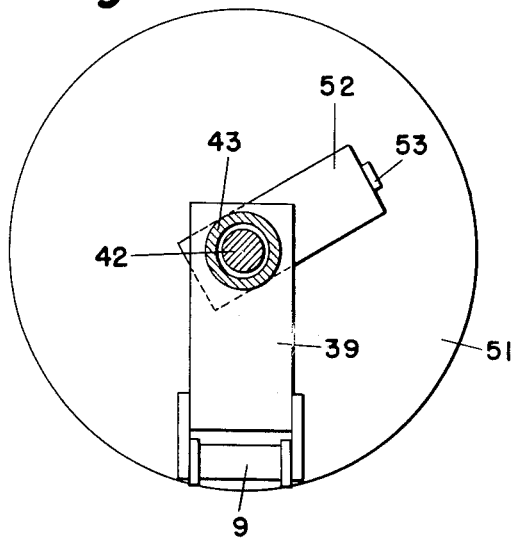
Figure 7:
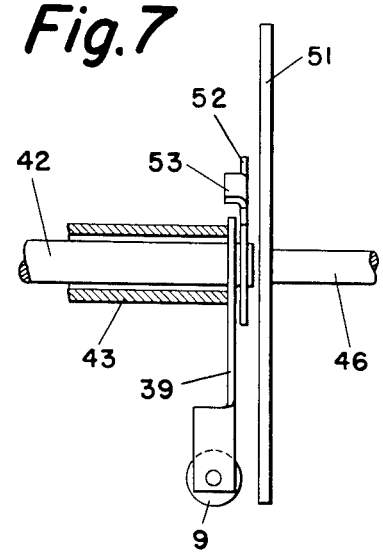
Figure 8:
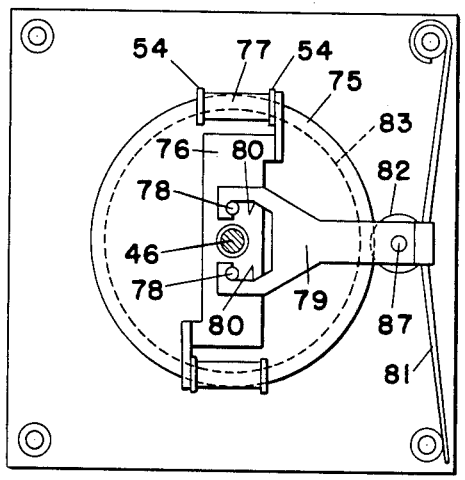
Figure 9:
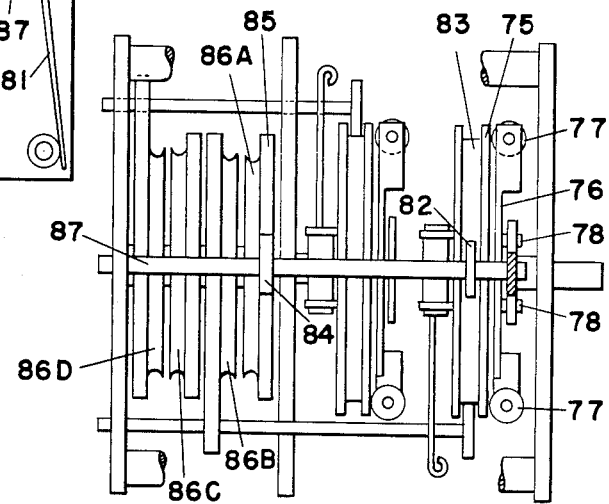

Fig. 5 schematically illustrates a position-indicator utilizable in the system of Figs. 1 and 2;

Fig. 6 is a front elevational view of an alternate electromagnetic clutch utilizable in the system of Figs. 1 and 2;

Fig. 7 is a side elevational view partly in section of the clutch of Fig. 6;

Fig. 8 is a front elevational view of another form of electromagnetic clutch; and Fig. 9 is a side elevation of an actuating unit incorporating the clutch means of Fig. 8.

Referring to Fig. 1, the television receiver 60 is provided with control devices for turning it on and off, for adjusting the audio volume, for selection of the desired station channel, for fine tuning of the selected channel, and for adjusting the picture contrast. Usually, the on-off switch and the volume control have a common shaft so that physically there are four control devices to be actuated in normal use of the receiver.

As hereinafter explained, these devices may be selectively actuated by actuating unit 61, at or within the receiver, from a remote observing location exemplified by armchair 62. A small switch box 1 at the observing location is provided with switches A–D corresponding with the control devices of the receiver 60 and is connected to the actuating unit 61 by cable 2 which is preferably flat. The receiver 60 and its actuating unit 61 are connected by electric power cord 64 to the available A. C. power line, usually a 110-volt, 60 cycle line. All components of actuating unit 61 which are connected by cable 2 to the switch box 1 are at all times electrically isolated from the power line to minimize the possibility of dangerous shock.

Figure 2B:
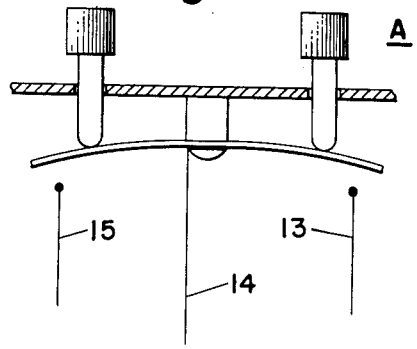
Figure 2C:
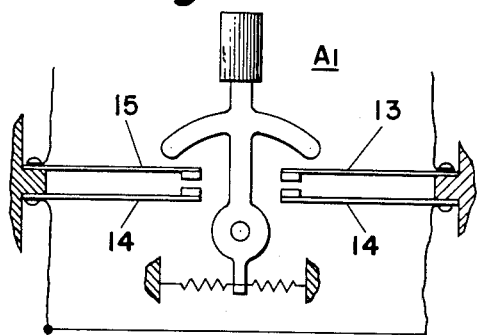

From location 62, the observer can close switch D to turn the receiver "on" or "off" and to raise or lower the audio volume level. By closing switch A, he may operate the channel-selector of the receiver. Preferably the receiver is provided with a window 3 through which a channel-indicator is visible, and preferably, the channel number to which the receiver is set is made more clearly visible by closing of switch E of the remote control box to energize an associated electric bulb located behind window 3. By closing switch B of the switch box 1, the observer may actuate the fine tuning control of the receiver. By closing switch C of the remote control box, the observed may actuate the contrast control of the receiver. Each of selector switches A to D is effectively a single-pole double-throw switch. For example, as shown in Fig. 2B, switch A may comprise two push buttons which may be selectively depressed to effect engagement of either of fixed contacts 13, 15 with movable contact structure 14, or as shown in Fig. 2C, the equivalent switch A1 may have a center-biased arm which may be rocked in either direction to effect engagement of either of movable contacts 13, 15 with fixed contact structure 14.

In the preferred actuating unit 61 (Figs. 3 and 4), the on-off switch 31, the audio volume control 30, the contrast control 35, and the tuner 27, including the channel-selector and fine tuning controls, are disposed with their shafts in alignment with the shaft of control motor 4. These control devices of the receiver 60 are selectively mechanically coupled to the shaft 46 of motor 4 by clutches respectively having electromagnets 8, 9, 10 and 11.

The motor 4 is a reversible motor preferably of the type having shading windings on the pole-pieces. In the particular motor 4 shown in Fig. 2A, the magnetic field structure 65 has pole-pieces 66A, 66B which are split to provide auxiliary poles 67A, 67B; 68A, 68B on which the shading windings 5, 6 are wound. With the main or primary winding 7 of the motor energized from an A. C. source, the rotor 69 will turn in one direction if the circuit of shading winding 5 is completed and will rotate in the opposite direction if the circuit of shading winding 6 is completed. In either case the completion of the circuit of the shading winding permits a current to flow whose reaction on the flux passing through the shaded portion of the pole causes that flux to lag behind the flux in the unshaded portion of the pole, thus producing a rotating field which develops a torque effecting rotation of the rotor 69 in the desired direction.

With the control system on standby, both shading windings are open-circuited and the rotor 69 is stationary despite continued energization of the main winding 7.

Referring now to Fig. 2, the terminal 70 of shading winding 5 is connected by a conductor of cable 2 to one contact of each of the selector switches A–D of switch box 1. Specifically, the terminal 70 of motor winding 5 is connected to contacts 13, 16, 19 and 22 of switches A–D. The terminal 71 of the other shading winding 6 is connected by another conductor of cable 2 to the opposite contacts 15, 18, 21 and 24 of selector switches A–D. The contacts 14, 17, 20 and 23 of switches A–D are respectively connected through conductors of control cable 2 to one terminal of the corresponding clutch electromagnets 8–11. The other terminals of the electromagnets are connected to the common terminal 72 of the shading windings.

Thus, for operation of the motor in one direction, the circuit of shading winding 5 is closed by engagement of contacts 13, 14 of switch A, of contacts 16, 17 of switch B, of contacts 19, 20 of switch C, or contacts 22, 23 of switch D. Which of the clutch electromagnets 8–11 is concurrently energized depends upon which of selector switches A–D is closed. For operation of the motor in reverse direction, the shading winding 6 of motor 4 is closed by engagement of contacts 14, 15 of switch A, of contacts 17, 18 of switch B, of contacts 20, 21 of switch C, or contacts 23, 24 of switch D. Which of the clutch electromagnets 8–11 is concurrently energized depends upon which of switches A–D is closed. Therefore by actuation of switches A–D, the observer at location 62 may effect operation of motor 4 in either direction and couple it selectively to any of the control devices of the television receiver 60 to perform any of the desired adjustments of volume, picture contrast, channel selection, fine tuning, etc.

Figure 4A:
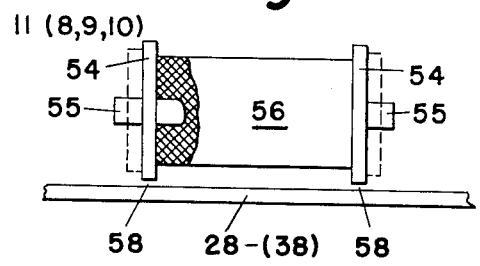
Figs. 4A and 4B are front and side elevational views of one of the electromagnets shown in Figs. 3 and 4.
Figure 4B:
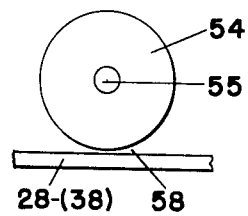
Figure 3:
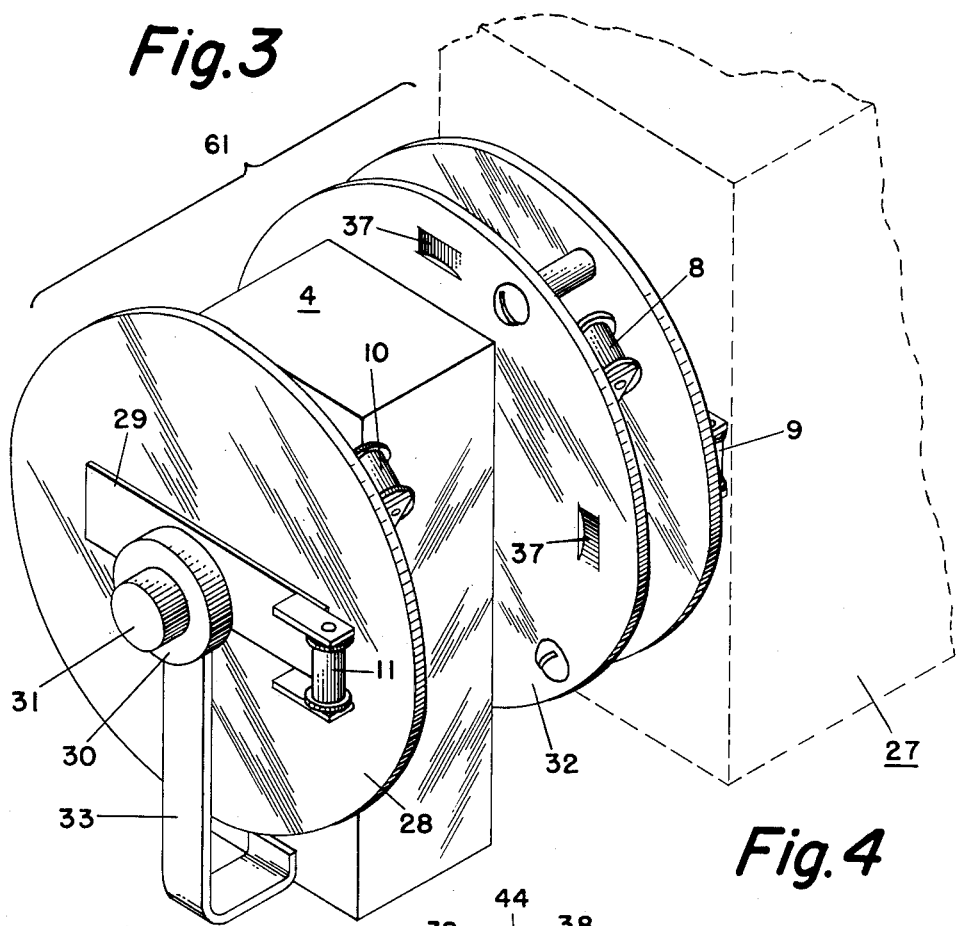
Fig. 3 is a perspective of an actuating unit utilizable in the system of Figs. 1 and 2.
Figure 4:
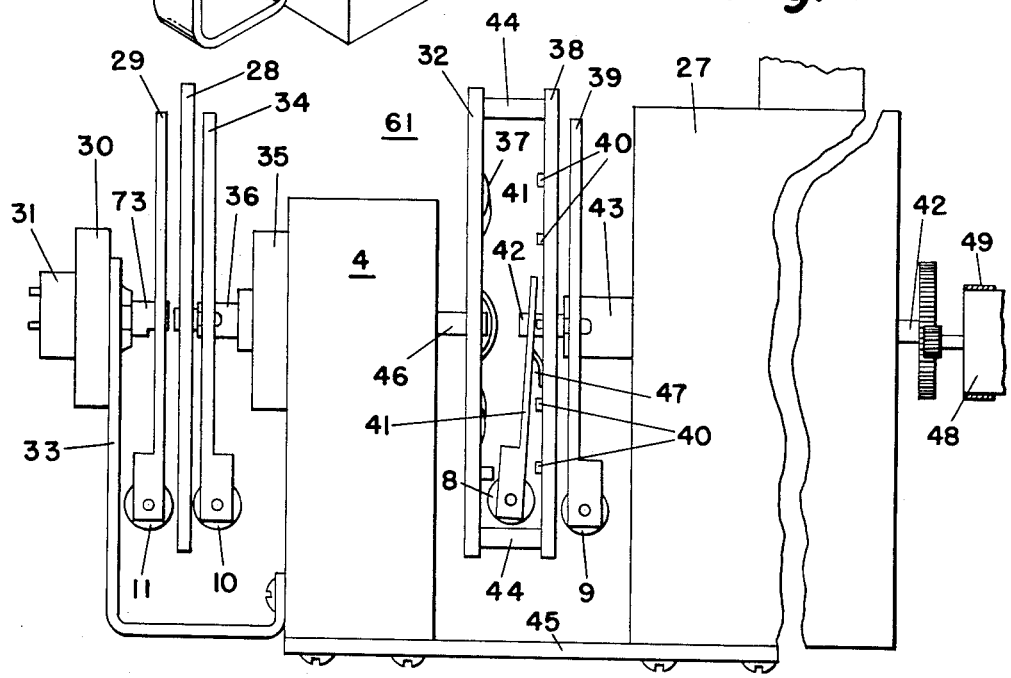
Fig. 4 is a side elevational view of the actuating unit of Fig. 3.

The preferred clutch arrangement for selective coupling of the motor 4 to the various control devices of the receiver 60 is shown in Figs. 3 and 4. The driving clutch member 28 for actuating the contrast and volume controls 35, 30 is a disc of magnetic material fastened to the rotor shaft 46 of motor 4. The driven member 29 for actuation of the volume control 30 and the "on-off" switch 31 is an arm suitably keyed to control shaft 73 for rotation therewith. As is well known in the art, as shaft 73 of the volume-control is angularly adjusted, it moves a contact arm over a resistance element to vary the audio volume. Near the limit of its travel in the volume-lowering direction, the shaft effects operation of the "on-off" switch 31 in the power-line circuit of the receiver.

When any of the switches A–C is closed, the disc 28 rotates, but since electromagnet 11 carried by arm 29 is not energized, the rotation of the driving clutch member 28 is not communicated to shaft 73 of the control devices 30, 31. When, however, the switch D is closed, the electromagnet 11 is energized concurrently with initiation of rotation of motor 4, whereupon driving engagement is effected between disc 28 and arm 29 to effect adjustment of shaft 73. This driving engagement is effected between the magnetic disc 28 and the pole-pieces 54, 54 of the electromagnet 11.

As best shown in Figs. 4A and 4B, the electromagnet 11, as well as the electromagnets 8–10, comprises circular pole-pieces 54, 54, disposed near the opposite ends of a central magnetic core member 55 upon which the coil 56 is wound. The electromagnet 11 is carried by arm 29 with the pole-pieces 54, 54 substantially at right angles to an adjacent face of the disc 28. With pole-pieces so shaped and disposed, there is a strong concentration of flux in the zones 58 between the driving clutch member 28 and the adjacent arcuate faces of the poles. The circular shape of the pole-pieces affords low manufacturing cost and insures the aforesaid desired flux concentration for any angular position in which the electromagnetic assembly is fastened to arm 29 by heading over the projecting ends of the core member 55.

When electromagnet 11 is energized, it tends to cling to disc 28 and be carried around by said disc in whichever direction the disc is rotating. When the switch D is opened, the mechanical coupling between disc 28 and electromagnet 11 is immediately broken and any further rotation of disc 28, due to inertia of the motor armature, is not communicated to arm 29.

The audio control 30 may therefore be adjusted in either direction and to the desired extent by closing switch D to effect engagement of its contacts 22, 23 for completion of the circuit of shading winding 5 or engagement of contacts 23, 24 for completion of the circuit of shading winding 6. Closing of switch D to complete the circuit of either shading winding permits a current to flow which energizes electromagnet 11, which in turn effects coupling of the motor to volume control 30. Thus, the volume may be adjusted in the desired direction and to the desired extent. By continuing to hold the switch D closed in the volume-lowering direction, the receiver 60 will be turned off by the actuation of the switch 31. To turn the receiver on again, the switch D is closed in the volume-raising direction.

The driven clutch member 34 for actuation of the shaft 36 of the contrast control carries a similar actuating electromagnet 10. The shaft 36 is hollow for passage through it of the motor shaft 46 and is suitably keyed, as by a flattened portion of its periphery, to the driven clutch arm 34. When any of switches A, B and D is closed, the driving clutch disc 28 is rotated by motor 4 but its motion is not transmitted to the driven clutch arm 34 since electromagnet 10 is not energized. When, however, switch C is closed in either direction to effect operation of motor 4 in a corresponding direction, the electromagnet 10 is also energized and is pulled against the disc 28 with which it tends to rotate so to effect angular adjustment of the contrast-control 35.

In brief, the disc 28 and electromagnet 11 constitute one clutch for coupling the combined volume control and "on-off" switch (30, 31) to the motor 4 and disc 28 and electromagnet 10 constitute a second clutch for coupling the contrast-control 35 to the motor 4. The disc 28 is the common driving element of these two clutches.

Another pair of clutches having a common driving element 38 provides for selective coupling of the fine-tuning control and the channel-selector to the motor 4 in accordance with the closing of switches A and B of the switch box 1. The driving member 38 is a disc of magnetic material, from which a large center portion has been removed, mounted for rotation about the axis of motor shaft 46 by the spacing posts 44 which connect disc 38 to disc 32 mounted on the motor shaft 46.

The concentric shafts 42 and 43 which extend from the television tuner 27 are respectively connected to its channel-selector and fine tuning control. The driven clutch arm 39 for operating the fine tuning control is suitably keyed to shaft 43 and carries the actuating electromagnet 9. When the driving clutch member 38 rotates in response to closing of any of switches A, C, and D, the electromagnet 9 is not energized and no adjustment of the fine tuning shaft 43 is effected. When, however, switch B is closed in either direction, the resulting energization of electromagnet 9 causes the electromagnet to cling to magnetic clutch member 38 and to tend to turn therewith and so effects adjustment of the fine tuning control in direction determined by the direction in which switch B is thrown.

When the channel-selector is of the continuous tuning type, a similar arrangement may be used for adjusting the channel-selector shaft 42. When, however, the channel-selector is of the turret type requiring substantially greater torque to step the turret from one channel-position to another channel-position, a somewhat modified form of clutch is preferred. In the particular arrangement shown in Fig. 3, the driven clutch member 41 for the channel-selector shaft 42 is suitably keyed to shaft 42 and is biased away from the disc 38 by spring 47 sufficiently to clear the angularly spaced stops 40 projecting from the adjacent face of disc 38.

The disc 32 is provided with a series of raised portions or cams 37 so spaced that the clutch arm 41 is periodically moved closely adjacent the face of the clutch disc 38 in the intervals between the stops 40. When any of the switches B, C, D is closed, the rotation of disc 38 is not transferred to arm 41. When the switch A is closed, the electromagnet 8 is energized and when arm 41 is next rocked by a cam 37 to brush against the disc 38, the magnetic pull of the then energized electromagnet 8 is sufficient to hold the arm against disc 38. The engagement of the next stop 40 with the arm 41 so held provides a positive drive from the disc 38 to the channel-selector shaft 42. The television receiver is thus stepped to successively higher or lower channels depending upon the direction of rotation of motor 4 selected by the switch A.

As shown in Figs. 4 and 5, the channel-selector shaft extends beyond the opposite end of the tuner 27 and is there provided with a drum 48 which drives a channel-indicator belt 49 or equivalent. Adjacent the window 3 of the television receiver (Fig. 1), the indicator belt passes over a pair of idler pulleys 50, 50. Between the pulleys and behind the belt is disposed the indicator lamp 12. The belt 49 is driven in synchronism with the channel-selector and the channel numbers are so spaced that the number adjacent the window 3 corresponds with the channel to which the receiver is tuned.

The remote control box 1 is provided with a switch E which closes a circuit through a shaded winding of the motor 4 and lamp 12. Thus the lamp need be lighted only when the observer desires to know the channel to which the set is tuned. As shown in Fig. 2, when the contacts 25, 26 of switch E are in engagement, the indicator lamp 12 is energized by current induced in the motor winding 5. When winding 5 is a shading winding, as in the preferred arrangement described, the motor will turn when the switch E is actuated but none of the receiver controls is disturbed since none of the clutch electromagnets 8–11 is energized.

Figs. 6 and 7 show a magnetic clutch arrangement whereby a single clutch may be used to actuate both the fine-tuning and channel-selector controls. In this modification, the driving clutch member is a magnetic disc 51 attached to the motor shaft 46. The driven arm 39 is suitably keyed to the fine-tuning shaft 43. Closing of switch B completes a circuit through one of the shading coils 5, 6 and electromagnet 9. The consequent energization of electromagnet 9 carried by arm 39 effects driving engagement between disc 51 and electromagnet 9. The fine tuning adjustment is therefore effected as before described. When a change in channels is desired, the switch B is kept in closed position until arm 39 engages the catch 53 on an arm 52 which is fixed to the channel-selector shaft 42. Thus, continued rotation of the fine-tuning shaft 43 will cause the receiver to be switched to higher or lower successive channels depending upon the direction of rotation of the motor. When the desired channel is reached, as may be noted by the picture on the television receiver screen, the switch B may be operated in reverse direction for adjustment of the fine-tuning control in normal manner. With this simpler system (not requiring the switch A and electromagnet 8 of Fig. 2), there is usually a delay between the time the tuning switch is first operated and the time the channel-selector starts the channel-switching operation.

Figs. 8 and 9 show another arrangement for selectively coupling any of four control devices (exemplified, or actuatable, by pulleys 86A—86D) to motor shaft 46 through two dual clutches having actuating electromagnets similar to those previously described. Since the four clutches are identical, only one of them is specifically described. The driving clutch structure includes a gear 83 and a disc 75 of magnetic material attached to motor shaft 46. The corresponding driven clutch arm 76 is loosely supported on shaft 46 and carries at its opposite ends the actuating electromagnets 77, 77. The pins 78, 78 projecting from arm 76 on opposite sides of shaft 46 both normally engage the hooked ends of yoke 79 which is biased by spring 81 to the inactive position shown in Fig. 8.

When the disc 75 is rotated by the motor in response to any of the control switches excepting the one in circuit with electromagnets 77, 77, the arm 76 remains decoupled from disc 75. When, however, the electromagnets 77, 77 are energized by actuation of the corresponding control switch (generally as described in discussion of Fig. 2), the electromagnets 77, 77 are pulled into engagement with disc 75 and rotate with it in the selected direction. As arm 76 rotates from the position shown in Fig. 8, one or the other of pins 78, depending upon the direction of rotation, pulls yoke 79 to the left and effects engagement of driven gear 82 with driving gear 83. So long as the electromagnets 77, 77 remain energized, this engagement of the gears is maintained. For large angular adjustments, there is slipping engagement between disc 75 and the pole-pieces 54 of electromagnets 77, 77. The driven gear 82 is on shaft 87 supported by yoke 79 and connected to one of the controlled devices (86A) through gears 84, 85. Thus so long as the corresponding switch remains closed, the device 86A is adjusted in the selected direction. When the electromagnet 77, 77 is deenergized, the arm 76 is immediately disengaged from disc 75; the spring 81 pulls the gear 82 from engagement with gear 83 and returns the now released clutch arm 76 to the position shown in Fig. 8, leaving the controlled device 86A in its new position.

In like manner, any of the other controlled devices 86B–86D may be selectively actuated in either direction and to desired extent.

For all the systems described, the control circuits comprising the selector switches and the clutch electromagnets are powered from current induced in the motor windings 5 or 6 so avoiding the need for a separate low-voltage power supply and at the same time obtaining isolation from the higher voltage line supplying the television receiver.

What is claimed is:

1. In an arrangement for remote operation of a device, a motor having a winding normally energized from an A. C. power line and a shading winding inductively coupled thereto, clutch means for mechanically coupling said device to said motor and including an actuating electromagnet, and a remote control switch operable to complete a circuit through said shading winding and said electromagnet to effect concurrent operation of said motor and energization of said clutch electromagnet by the induced current of said shading winding.

2. In an arrangement for remote operation of a device in either of two directions, a reversible motor having a winding normally energized from an A. C. power line and shading windings inductively coupled thereto, a clutch for mechanically coupling said device to said motor and including an actuating electromagnet, and a remote control switch operable to complete a circuit including said electromagnet and a selected one of said shading windings to effect concurrent operation of said motor in the desired direction and to cause energization of said clutch electromagnet by the induced current of said one of the shading windings.

3. A remote control system for selectively actuating each of a number of devices in either of two directions comprising a reversible motor having a winding normally energized from an A. C. power line and shading windings inductively coupled thereto, clutches, each having an actuating electromagnet, for respectively mechanically coupling said devices to said motor; and selector switches connected to said shading windings and to said clutch electromagnets for selective actuation of said devices upon selective closure of said switches.

4. An arrangement for remotely selectively actuating two or more devices in either of two directions comprising a reversible A. C. motor having a field winding and shading windings; clutches, each having an actuating electromagnet, for respectively mechanically coupling said devices to said motor; and selector switches operable to include a selected one of said electromagnets in circuit with a selected one of said shading windings for energization of the electromagnet by current induced in the shading winding thereby to effect actuation by said motor of a selected one of said devices in a desired direction.

5. An arrangement as in claim 4 in which at least one of said devices is provided with a position-indicator including an electrically-operable element, and in which said element is energized by current derived from one of said shading windings.

6. An arrangement as in claim 4 in which at least two of the clutches include a common driving member of magnetic material rotatable by the motor and whose respective driven members are rotatable about the axis of said driving member, are disposed on opposite sides of said driving member, and respectively carry the electromagnets energized from the selected shading windings to effect driving engagement between said driving member and the corresponding driven element.

7. An arrangement as in claim 4 in which the driving elements of said clutches are of magnetic material and rotated on a common axis by the motor, and in which the driven clutch members are in pairs with the members of each pair on opposite sides of one of said driving elements and respectively carry the electromagnets selectively energized from the shading windings to effect driving engagement between the corresponding driven element and the adjacent driving member.

8. An arrangement for remote selective actuation of devices in either of two directions comprising a reversible motor having a winding normally energized from an A. C. line and shading windings inductively coupled thereto, switches each operable to complete a circuit including a selected one of said shading windings so to effect operation of the motor in the desired direction, and clutches for respectively mechanically coupling said devices to said motor and each including an electromagnet in circuit with the corresponding one of said switches for energization by the current induced in the shading winding selected by that switch.

9. In an arrangement for remote operation of a device, a motor having a first winding for energization from an alternating-current power line and a second winding inductively coupled to said first winding, a clutch for mechanically coupling said device to said motor and including an actuating electromagnet, and a remote control switch operable to effect energization of said clutch electromagnet by current induced in said second motor winding by current flowing in said first motor winding.

10. An arrangement as in claim 9 in which one of the elements of said clutch is a magnetizable disc, and in which the relatively movable clutch element carries an electromagnet having substantially circular pole-pieces disposed with their planes substantially normal to a face of said disc.

11. In an arrangement for remote actuation of the controls of a television receiver having adjustable controls such as volume, contrast and tuning, electromechanical actuation mechanism at the receiver including an electric motor and clutches for respectively coupling said controls to said motor, said motor having a first winding for energization from an A. C. power line and normally open-circuited shading windings inductively coupled to said first winding and each of said clutches including an actuating electromagnet having one of its terminals connected to a terminal of said shading windings; a switch box remote from said receiver and including selector switches respectively corresponding with said adjustable controls; and a cable from said television receiver to said switch box having conductors respectively connecting contact structure of each selector switch to another terminal of the corresponding clutch electromagnet and having conductors respectively connecting the individual terminals of said shading windings to contacts of each switch, said contacts of each switch being selectively engageable with said contact structure thereof to effect concurrent operation of said motor in a selected direction and operation of a selected one of said clutches by current induced in a selected one of said shading windings.

12. An arrangement as in claim 11 in which one of said adjustable devices is a channel-selector, in which said control mechanism at the receiver additionally includes a position-indicator driven with said channel-selector and including an electric lamp having a terminal connected to said common terminal of the shading windings, in which said switch box includes a channel-indicator switch having a contact connected to one of said shading winding conductors, and in which said cable includes a conductor connected to the other terminal of said lamp.

No references cited